Patented Oct. 8, 1940

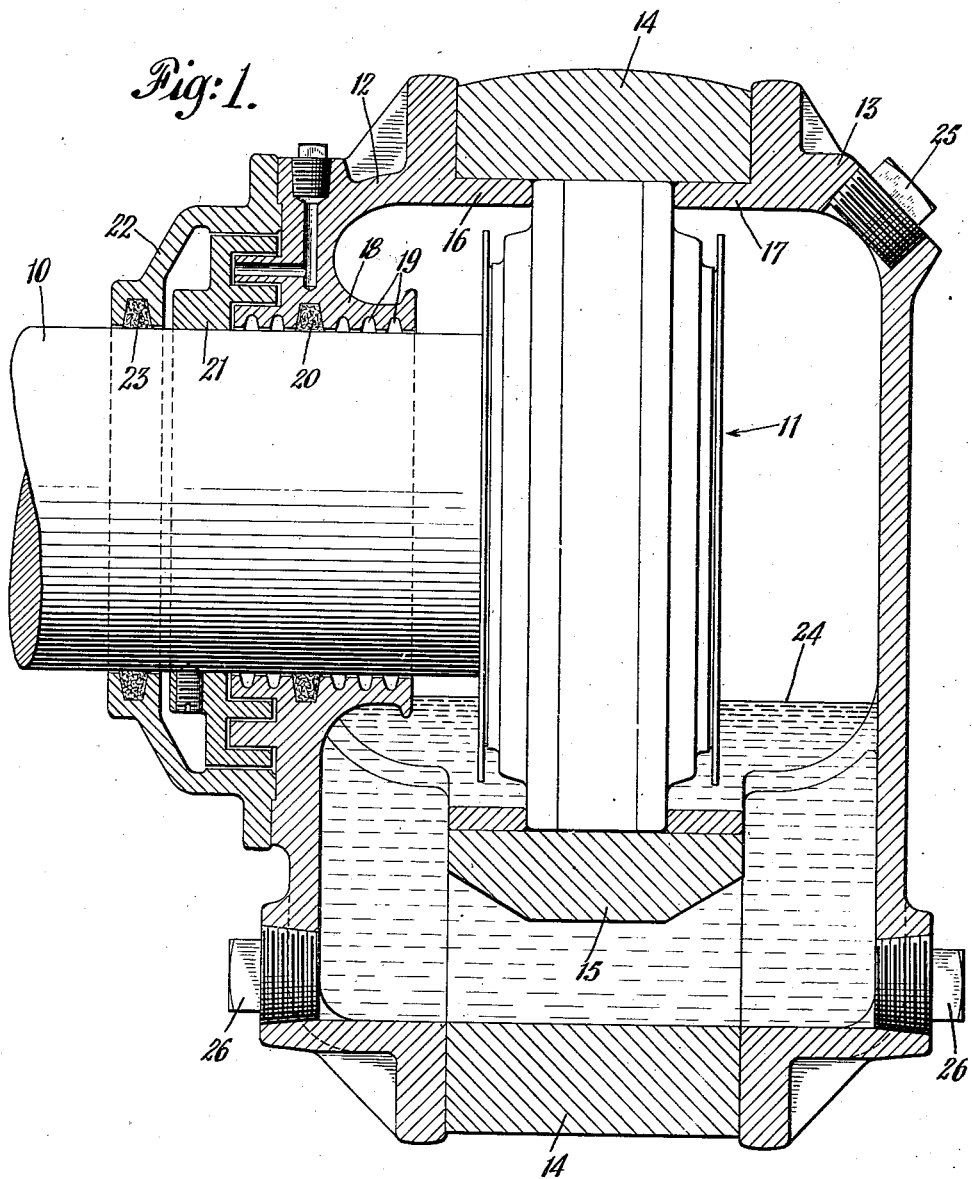

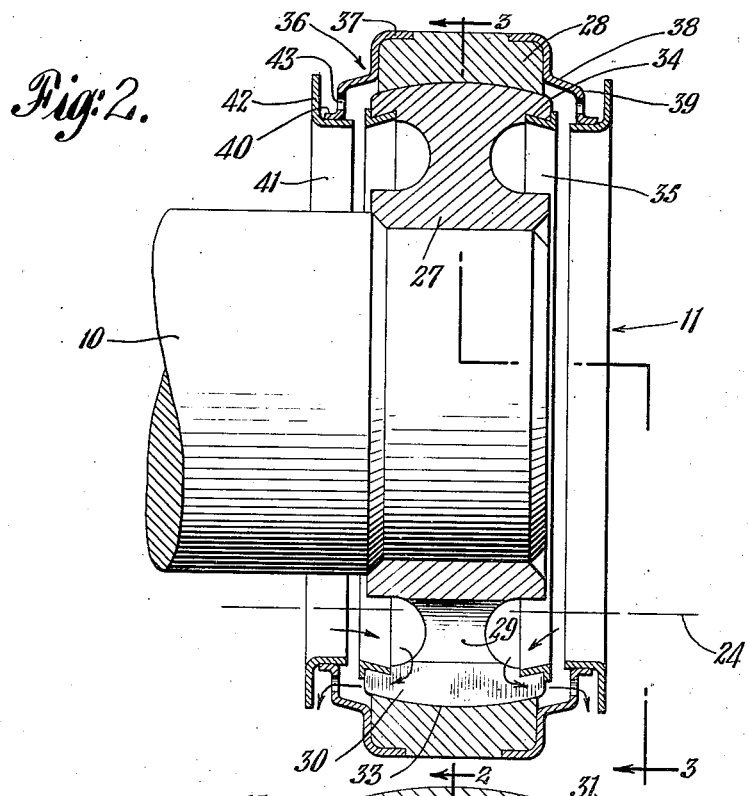
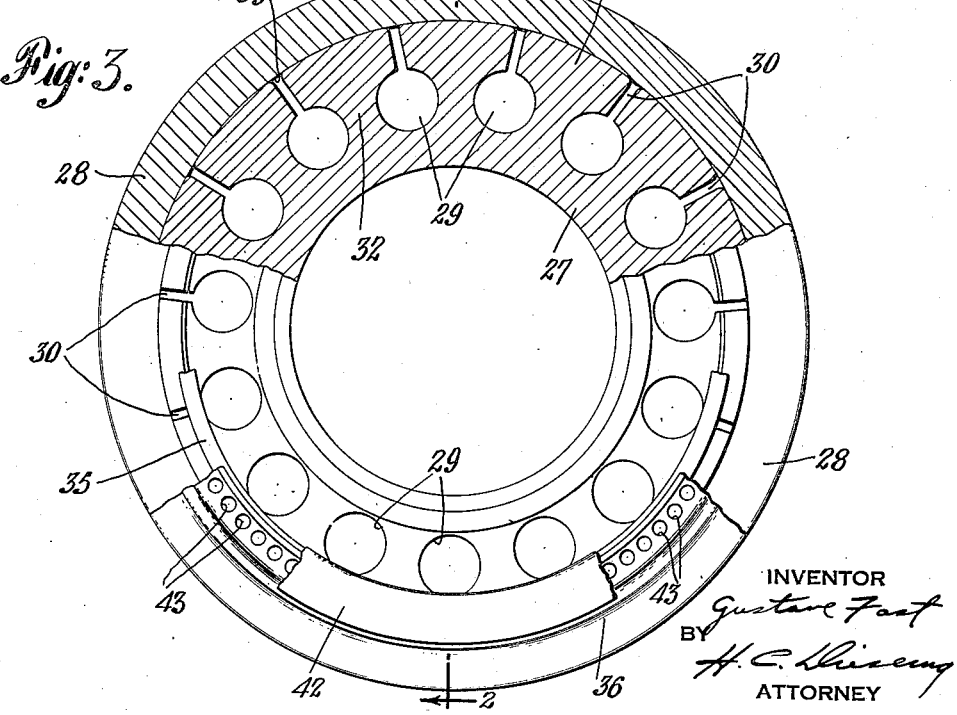

2,217,201

UNITED STATES PATENT OFFICE 2,217,201

BEARING STRUCTURE

Gustave Fast, Annapolis, Md., assignor to The Fast Bearing Company, Baltimore, Md., a corporation of Maryland Application December 2, 1936, Serial No. 113,805

11 Claims. (Cl. 308—126)

This invention relates to bearing structures and particularly to the lubrication thereof. It has special reference to the lubrication of bearings of the block type or bearings otherwise designed to develop wedge-shaped lubrication films.

In the improved bearing structure the journal member is arranged with its lower portion immersed in a bath of oil and the oil is automatically fed between the bearing surfaces, in part by gravity and in part by the suction created due to the pump impeller action of the journal.

Various problems are involved in effecting lubrication in this manner. As the journal rotates at high speed there is a tendency to whip the oil into a foam and to splash it about at random, particularly when the journal is formed with shoulders, such as the edges of blocks, which periodically dip into the oil. It is difficult to prevent this oil from striking the shaft upon which the journal member is mounted and if any considerable quantity of oil tends to work its way outwardly along the shaft, it is almost impossible to prevent its escape. Moreover, foaming oil is less effective as a lubricant than oil having its full body.

Another problem is the prevention of short circuiting or by-passing within the bath of oil, i. e., the tendency of a certain limited portion of the oil to circulate continuously through the bearing zone while the greater bulk of the oil serves no useful purpose.

It has been a primary object of the present invention to so construct the stationary and rotating portions of the structure that splashing and foaming will be substantially prevented and accordingly the lubricant will be effectively retained and its efficiency preserved.

Another object has been to induce such circulation of the oil within the bearing housing that all portions of it will periodically pass between the bearing surfaces and none will be subjected to re-use at such frequent intervals that it will become heated to a detrimental degree.

A further object has been to increase the rate at which the oil is circulated so the volume of flow is considerably in excess of the lubrication requirements and is in fact so great that it assists materially in cooling the bearing and thus also prevents destruction of the lubricant.

Other objects and advantages of the invention will appear from the detailed description of one form of the same which will now be given in conjunction with the accompanying drawings, in which:

Fig. 1 is an axial section through a housing embodying the improved bearing structure which is shown in elevation.

Fig. 2 is an axial section through the bearing structure, taken along the line 2—2 of Figure 3, and Fig. 3 is a view partly in elevation and partly in section through the bearing structure, as indicated by the line 3—3 of Figure 2.

Referring now to the drawings, the improved bearing may, for example, be associated with a shaft 10 whose end is received by the bearing structure, indicated generally by the character 11. This bearing structure may be enclosed and retained by a suitable housing supported in any convenient way from an appropriate foundation. The housing may be formed by two outer sections 12 and 13 and a central section 14 suitably secured by means of bolts or the like (not shown). The central section may have an annular portion, formed in part by the main body of said section and in part by an intermediate cross-member 15, arranged to rather snugly receive and support the bearing structure 11. Annular flanges 16 and 17 may be integral with the end sections 12 and 13, respectively, and may be arranged to engage the opposite sides of the bearing structure and hold it in place.

To provide an effective seal around the shaft 10, where it enters the housing, the section 12 may suitably be provided with a hub portion 18 having a slight clearance with respect to the shaft and having a series of annular grooves 19 around its inner periphery. A sealing member 20, or other suitable packing means, may be provided in a groove also formed in the hub 18. Secured to the shaft 10 is a guard 21 which may suitably be formed with annular, axially extending flanges fitting between corresponding flanges on the housing section 12. A final closure member 22, secured to the section 12 by bolts or the like, may enclose the guard 21 and may in turn retain suitable packing or sealing means 23 in engagement with the shaft. It will be apparent that this construction provides very effective protection against the escape of lubricant along the shaft and against the entry of dirt. Any lubricant that tends to creep outwardly along the shaft will first be thrown by centrifugal action into the grooves 19 and will be carried around in the latter to the bottom of the hub portion 18, which may, if desired, be provided with suitable openings, not shown, for returning the oil to the bottom of the housing. Any oil that is not returned in this manner will largely be prevented from further egress by means of the packing 20. Should any small amount of oil find its way beyond this packing, it will find it difficult to escape around the tortuous passage between the member 21 and section 12 and through the packing 23. In normal use the housing should be filled with oil to about the level indicated at 24 in Figs. 1 and 2. A plug 25 at the top of the housing may be removed whenever a fresh supply of oil is to be introduced while plugs 26 at the bottom serve for drainage and cleaning purposes.

The bearing structure 11 may be of a variety of different forms, although certain features of the invention are particularly present and advantageous in connection with a bearing of the type illustrated in Figs. 2 and 3. This may suitably comprise a journal member 27 secured, by a pressed fit or in any other convenient way, to the shaft 10 and a cooperating bearing member 28. The latter preferably has a spherical bearing surface 33, particularly if it is desired to have a universal or self-aligning action. The journal member 27, in the preferred form, has a series of axially extending, cylindrical passages 29 and a series of radially extending slots 30 which extend completely across the journal member and divide the outer portion of the journal member into a series of spaced blocks 31. Each of these blocks is integrally united with the hub portion of the journal member by means of a relatively slender neck 32 which, in the operation of the journal, may be flexed slightly in the manner more fully explained in my copending application Ser. No. 112,891 filed on November 27, 1936 to provide wedge-shaped lubrication films between the blocks and the bearing surface of the member 28. As explained in said application, the outer faces of the blocks are preferably spheroidal in form, having a radius of curvature in an axial direction equal to that of the spherical face of the bearing member, while its radius in a circumferential direction is slightly less so that the journal may fit snugly but turn freely within the bearing. The ends of the blocks 31 are chamfered or rounded to assist in the production of the wedge-shaped films.

The side edges of the blocks 31 are preferably cut away, as indicated at 34 in Fig. 2, and arranged to receive continuous, annular flow lips 35. The flow lip, one of which is provided at each side or end of the journal member, has its outer face in a plane perpendicular to the axis of the bearing and has a portion that is spun into the cut-away portions 34 of the blocks. This spun portion of the flow lip is inclined at a slight angle to the axis of the journal member, the inclination being away from the axis from the outer face of the flow lip toward its inner edge, i. e., toward the central, transverse plane of the journal member.

At each side of the bearing member 28 there is provided a guard member 36 secured in any suitable way to the bearing member. This guard member may suitably be formed with a substantially cylindrical portion 37 surrounding a shouldered portion of the bearing member and frictionally or otherwise secured thereto. The shouldered portion of the bearing member preferably slopes inwardly at a small angle toward the center of the member. An inclined portion 38 of the guard member, extending from the side of the bearing member, carries at its end a radially extending wall portion 39, which in turn terminates in an axially extending flange portion 40. The latter is secured, by means of a pressed fit or the like, to an axially extending portion 41 of a baffle member having another portion 42 extending radially outwardly from the portion 41 in slightly spaced relation to the wall 39 of member 36. A continuous series of apertures 43 are provided around the wall section 39, these apertures being relatively closely spaced, as best shown in Fig. 3. The axially disposed portion 41 of the baffle member preferably extends inwardly beyond the inner face of the wall section 39 to a slight extent and is spaced only a small distance from the outer face of the flow lip 35. Preferably, the axially extending portions of the flow lip and baffle member are substantially in alignment.

In the operation of the bearing, the journal member will rotate and carry the blocks 31 successively into the bath of oil in the reservoir at the level 24. The oil, however, will not splash to any appreciable extent and will not be whipped into a foam as a result of this action, due to the presence of the continuous, annular flow lips 35 at the opposite edges of the blocks. These flow lips will not present shoulders to strike the oil in a manner calculated to splash the same. While certain shouldered surfaces are provided adjacent the central plane of the journal member, these are so situated that they will not tend to create any appreciable splashing of the oil and will not cause the oil to be thrown against the shaft 10, which is an important consideration.

It will be clear that in the operation of the journal, the oil will flow by gravity in a segment-shaped stream over the axially extending portion 41 of the baffle member and inwardly along the flow lip 35 to the axially extending passages 29. These, in turn, will deliver the oil to the slots 30. Due to the centrifugal force imparted to the oil as it passes over the flow lip it will be thrown forcibly toward the surface of the bearing member 28 and will, of course, supply the desired films in the wedge pockets formed between the blocks and the bearing surface. The centrifugal pumping action of the journal will induce a considerably greater flow of oil than is required for such lubrication purposes. The oil will flow into the passages 29 and 30 not only by gravity, as explained, but also by virtue of the suction created by the centrifugal pumping action. In this connection it should be observed that the preferred construction is such that very little resistance to the flow of the oil is interposed. Slots 30, extending completely across the journal member, allow an abundant flow of oil to the bearing surface. The excess lubricant circulated in this way affords an excellent cooling medium for the bearing surface.

A part of the oil supplied to the bearing surface in the manner indicated will be thrown outwardly through the slots 30 toward the sides or ends of the bearing while the greater part of the oil forming the pressure films will be squeezed outwardly at the sides. All of this oil will be thrown as a continuous stream toward the wall 39 of the guard member, and will be discharged through the openings 43 against the radially extending wall 42 of the baffle member. This baffle member will then direct the oil outwardly in a radial direction away from the journal axis and will produce a circulation of the oil throughout the reservoir. Sufficiently forceful currents will be established in the body of oil, in view of the abundant flow described, to insure a more or less continual circulation of the entire body within the reservoir. Accordingly, it is insured that the oil passing over the flow lip 35 into the bearing will be relatively fresh and cool and will not be the hot oil that has just been discharged from the bearing surface. In this connection it should be observed that the oil retained between the guard member and bearing is subjected to centrifugal force due to its spinning movement. It should also be observed that in the preferred construction the outer edges of the apertures 43 are inside of the bearing surface diameter so that the ring of oil which accumulates in the splash guard will continually submerge the bearing surface.

While a preferred form of the invention has been described in considerable detail, it will be understood that this is for purposes of illustration only and that numerous changes may be made without departing from the general principles and scope of the invention. The terms and expressions employed herein have been used as terms of description and not of limitation.

What I claim is:

1. In a structure of the class described a bearing member, a journal member within said bearing member and cooperating therewith, said journal member having a series of passages extending across its face and having channels for delivering a lubricant to said passages, a guard member carried by said bearing member and presenting a wall in spaced relation to said bearing member, said wall having apertures therethrough in substantial alinement with the cooperating surfaces of said bearing and journal members, and baffle means carried by said guard member to deflect radially outwardly lubricant passing through said apertures.

2. In a structure of the class described a bearing member, a journal member within said bearing member and cooperating therewith, said journal member having a series of passages extending across its face and having channels for delivering a lubricant to said passages, a continuous, annular flow lip on said journal member arranged to receive the lubricant and deliver it to said channels, a guard member carried by said bearing member and presenting a wall in spaced relation to said bearing member, said wall having apertures therethrough inwardly of the cooperating surfaces of said bearing and journal members, and baffle means carried by said guard member to deflect radially outwardly lubricant passing through said apertures.

3. In a structure of the class described a bearing member, a journal member within said bearing member and cooperating therewith, said journal member having a series of passages extending across its face and having channels for delivering a lubricant to said passages, a continuous, annular flow lip on said journal member arranged to receive the lubricant and deliver it to said channels, said flow lip being angled outwardly from the axis of said journal member in a direction from the face of the latter toward its central transverse plane, a guard member carried by said bearing member and presenting a wall in spaced relation to said bearing member, said wall having apertures therethrough in substantial alinement with the cooperating surfaces of said bearing and journal members, and baffle means carried by said guard member to deflect radially outwardly lubricant passing through said apertures.

4. In a structure of the class described a bearing member, a journal member within said bearing member and cooperating therewith, said journal member having a series of passages extending across its face and having channels for delivering a lubricant to said passages, a continuous, annular flow lip on said journal member arranged to receive the lubricant and deliver it to said channels, a guard member carried by said bearing member and presenting a wall in spaced relation to said bearing member, said wall having apertures therethrough in substantial alinement with the cooperating surfaces of said bearing and journal members, and baffle means carried by said guard member to deflect radially outwardly lubricant passing through said apertures, the inner edges of said guard member and said baffle means being substantially in axial alinement with said flow lip.

5. In a structure of the class described a bearing member, a journal member within said bearing member, said journal member having a series of spaced blocks cooperating with said bearing member, and a continuous flow lip secured to said blocks and extending along one edge of said blocks and bridging the spaces between said blocks and arranged to deliver oil to the spaces between said blocks.

6. In a structure of the class described a housing having an oil reservoir therein, a bearing member carried by said housing with its lower portion extending into said oil reservoir and in direct communication therewith, a journal member within said bearing member, said journal member carrying a series of spaced blocks cooperating with said bearing member to provide wedge-shaped film pockets therewith, and an annular flow lip extending continuously along one edge of said blocks and having an inwardly extending portion for directing oil from said reservoir to the spaces between said blocks.

7. In a structure of the class described a housing having an oil reservoir therein, a bearing member carried by said housing with its lower portion extending into said oil reservoir and in direct communication therewith, a journal member within said bearing member, said journal member carrying a series of spaced blocks cooperating with said bearing member to provide wedge-shaped film pockets therewith, an annular flow lip extending continuously along one edge of said blocks and having an inwardly extending portion for directing oil from said reservoir to the spaces between said blocks, and means associated with said bearing member for directing oil discharged from the bearing radially outwardly beyond the point of discharge.

8. In a structure of the class described a housing having an oil reservoir therein, a bearing member carried by said housing with its lower portion extending into said oil reservoir, a journal member within said bearing member, said journal member carrying a series of spaced blocks cooperating with said bearing member to provide wedge-shaped film pockets therewith, an annular flow lip extending continuously along one edge of said blocks and having an inwardly extending portion for directing oil from said reservoir to the spaces between said blocks, and means associated with said bearing member for directing oil discharged from the bearing away from said flow lip, said flow lip and said means having relatively rotating portions presenting alined, substantially cylindrical surfaces in slightly spaced relation.

9. In a structure of the class described a housing having an oil reservoir therein, a bearing member carried by said housing with its lower portion extending into said oil reservior, a journal member within said bearing member, said journal member carrying a series of spaced blocks cooperating with said bearing member to provide wedge-shaped film pockets therewith, an annular flow lip extending continuously along one edge of said blocks and having an inwardly extending portion for directing oil from said reservoir to the spaces between said blocks, and means associated with said bearing member for directing oil discharged from the bearing away from said flow lip, said means comprising a pair of spaced wall sections extending radially with respect to the journal axis, one of said wall sections being perforated and arranged to direct oil discharged from the bearing against the other of said wall sections.

10. In a structure of the class described a bearing member, a journal member, said members having substantially spherical cooperating surfaces, and a guard extending from said bearing member, said guard comprising a wall in spaced relation to said bearing member and having an inlet aperture and a series of outlet apertures therein, the outlet apertures in said wall being located closely adjacent said cooperating surfaces but having their outermost extremities at a smaller radial distance from the axis of said bearing member than the nearest portion of said cooperating surfaces.

11. In a structure of the class described a housing having an oil reservoir therein, a bearing member, a journal member within said bearing member, said journal member having a series of spaced blocks cooperating with said bearing member, and a continuous flow lip extending along the edges of said blocks at each side thereof and arranged in direct communication with the oil in said reservoir to deliver oil to the spaces between said blocks, each of said flow lips extending from a face of said journal member toward the central transverse plane thereof and having an outward flare in that direction.

GUSTAVE FAST.